(12) United States Patent
Sano (10) Patent No.: US 7,199,356 B2
(45) Date of Patent: Apr. 3, 2007

(54) ABSOLUTE ANGLE DETECTING DEVICE

(75) Inventor: Tadashi Sano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/230,229

(22) Filed: Sep. 13, 2005

(65) Prior Publication Data

US 2006/0054797 A1    Mar. 16, 2006

(30) Foreign Application Priority Data

Sep. 16, 2004 (JP) ............................ 2004-270242

(51) Int. Cl.
*G01D 5/34* (2006.01)
(52) U.S. Cl. .................... 250/231.15; 250/231.14; 250/231.13; 356/616; 356/617
(58) Field of Classification Search ........... 250/231.13–231.18; 180/444; 356/616, 617, 356/316; 33/1 PT, 1 N, 1 L; 341/11, 13, 341/15; 701/41
See application file for complete search history.

(56) References Cited

U.S. PATENT DOCUMENTS

| | | | |
|---|---|---|---|
| 4,177,695 A | 12/1979 | Grove | |
| 5,818,038 A * | 10/1998 | Kerkmann et al. | 250/231.13 |
| 6,130,425 A | 10/2000 | Sano | |
| 6,155,106 A * | 12/2000 | Sano | 73/118.1 |
| 6,248,993 B1 | 6/2001 | Bunselmeier et al. | |
| 6,272,912 B1 * | 8/2001 | Sano | 73/118.1 |
| 6,420,697 B1 * | 7/2002 | Donner et al. | 250/231.14 |
| 6,524,209 B2 * | 2/2003 | Ito et al. | 475/162 |
| 6,956,198 B2 * | 10/2005 | Alsobrooks et al. | 250/231.13 |
| 2004/0046112 A1 * | 3/2004 | Durocher | 250/231.13 |
| 2006/0015227 A1 * | 1/2006 | Knoll | 701/41 |

FOREIGN PATENT DOCUMENTS

JP     10227631 A  *  8/1998

* cited by examiner

*Primary Examiner*—Stephone B. Allen
*Assistant Examiner*—Davienne Monbleau
(74) *Attorney, Agent, or Firm*—Brinks Hofer Gilson & Lione (57) ABSTRACT

First and second signal detecting element groups are respectively arranged to face first and second signal detecting tracks that are provided on a first code wheel. In addition, third and fourth signal detecting element groups are respectively arranged to face third and fourth signal detecting tracks that are provided on a second code wheel. A code string is output from the first and second signal detecting element groups to obtain a circular gray-code for detecting the rotation of the first code wheel within one revolution. Further, a code string is output from the third and fourth signal detecting element groups to obtain a circular gray-code for detecting the rotation of the first code wheel over one revolution.

13 Claims, 8 Drawing Sheets

Improved Gray-code Pattern (for 1.5 degree resolution)

| Angle (degree) | 0 | 1.5 | 3 | 4.5 | 6 | 7.5 | 9 | 11 | 12 | 14 | 15 | 17 | 18 | 20 | 21 | 23 | 24 | 26 | 27 | 29 | 30 | 32 | 33 | 35 |
|---|---|---|---|---|---|---|---|---|---|---|---|---|---|---|---|---|---|---|---|---|---|---|---|---|
| Signal C(n)   | 0 | 0 | 0 | 0 | 1 | 1 | 1 | 1 | 0 | 0 | 0 | 0 | 0 | 0 | 0 | 0 | 0 | 0 | 0 | 1 | 1 | 1 | 0 | 0 |
| Signal C(n+1) | 1 | 1 | 1 | 1 | 1 | 0 | 0 | 0 | 0 | 1 | 0 | 0 | 1 | 1 | 1 | 1 | 1 | 0 | 0 | 0 | 0 | 0 | 0 | 0 |
| Signal C(n+2) | 0 | 1 | 1 | 1 | 1 | 1 | 1 | 1 | 1 | 1 | 1 | 1 | 1 | 0 | 0 | 0 | 1 | 1 | 1 | 0 | 0 | 1 | 0 | 1 |
| Signal C(n+3) | 0 | 0 | 0 | 1 | 1 | 1 | 0 | 0 | 0 | 0 | 1 | 1 | 1 | 1 | 1 | 0 | 0 | 1 | 1 | 0 | 1 | 1 | 1 | 0 |
| Signal C(n+4) | 0 | 0 | 1 | 1 | 1 | 1 | 0 | 0 | 0 | 0 | 0 | 0 | 1 | 1 | 1 | 0 | 0 | 1 | 1 | 1 | 1 | 1 | 1 | 1 |
| Signal C(n+5) | 0 | 0 | 0 | 0 | 0 | 0 | 0 | 0 | 1 | 0 | 1 | 1 | 1 | 1 | 0 | 0 | 0 | 0 | 1 | 1 | 1 | 1 | 1 | 0 |

| Angle (degree) | 36 | 38 | 39 | 41 | 42 | 44 | 45 | 47 | 48 | 50 | 51 | 53 | 54 | 56 | 57 | 59 | 60 | 62 | 63 | 65 | 66 | 68 | 69 | 71 |
|---|---|---|---|---|---|---|---|---|---|---|---|---|---|---|---|---|---|---|---|---|---|---|---|---|
| Signal C(n)   | 0 | 0 | 1 | 1 | 1 | 1 | 1 | 0 | 0 | 1 | 1 | 1 | 1 | 1 | 1 | 1 | 1 | 1 | 1 | 1 | 1 | 1 | 0 | 0 |
| Signal C(n+1) | 0 | 0 | 0 | 0 | 0 | 1 | 0 | 0 | 0 | 0 | 1 | 1 | 0 | 1 | 0 | 0 | 0 | 1 | 0 | 1 | 1 | 1 | 1 | 1 |
| Signal C(n+2) | 0 | 0 | 0 | 0 | 1 | 0 | 0 | 0 | 0 | 0 | 0 | 0 | 0 | 1 | 1 | 0 | 0 | 0 | 1 | 1 | 0 | 1 | 0 | 0 |
| Signal C(n+3) | 0 | 0 | 0 | 0 | 1 | 1 | 0 | 0 | 0 | 0 | 0 | 1 | 1 | 0 | 0 | 1 | 0 | 0 | 0 | 0 | 1 | 0 | 0 | 0 |
| Signal C(n+4) | 1 | 1 | 1 | 1 | 1 | 1 | 0 | 1 | 0 | 0 | 0 | 0 | 1 | 1 | 1 | 1 | 0 | 0 | 0 | 1 | 1 | 1 | 0 | 0 |
| Signal C(n+5) | 0 | 1 | 1 | 1 | 1 | 1 | 1 | 1 | 1 | 1 | 1 | 1 | 1 | 0 | 1 | 0 | 0 | 0 | 0 | 0 | 1 | 1 | 1 | 1 |

FIG. 7

Improved Gray-code Pattern (for 0.5 degree resolution)

FIG. 8

Improved Gray-code Pattern (for sector detection)

| Angle (degree) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Signal A(n) | 0 | 0 | 1 | 1 | 1 | 1 | 1 | 1 | 0 | 0 | 0 | 0 | 0 | 0 | 0 | 0 | 1 | 1 | 1 | 1 | 0 | 1 | 0 | 0 | 0 | 0 | 0 | 0 | 0 | 0 |
| Signal A(n+1) | 0 | 0 | 0 | 0 | 0 | 1 | 1 | 1 | 1 | 1 | 0 | 0 | 0 | 0 | 0 | 1 | 1 | 1 | 1 | 0 | 0 | 0 | 0 | 0 | 0 | 0 | 0 | 1 | 1 | 1 |
| Signal A(n+2) | 1 | 1 | 1 | 0 | 1 | 0 | 1 | 0 | 0 | 1 | 1 | 1 | 1 | 0 | 1 | 0 | 0 | 0 | 1 | 1 | 1 | 0 | 0 | 1 | 0 | 0 | 1 | 1 | 0 | 1 |
| Signal A(n+3) | 0 | 0 | 0 | 0 | 0 | 0 | 1 | 1 | 1 | 1 | 1 | 1 | 0 | 0 | 1 | 0 | 0 | 1 | 1 | 1 | 0 | 0 | 1 | 1 | 0 | 1 | 1 | 1 | 0 | 1 |
| Signal A(n+4) | 1 | 1 | 1 | 1 | 0 | 1 | 1 | 1 | 1 | 1 | 1 | 0 | 0 | 0 | 0 | 1 | 1 | 1 | 1 | 1 | 0 | 1 | 1 | 0 | 0 | 1 | 1 | 0 | 1 | 1 |
| Signal B(n+5) | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 |

| Angle (degree) | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Signal A(n) | 1 | 1 | 1 | 1 | 1 | 0 | 0 | 1 | 1 | 1 | 0 | 1 | 1 | 1 | 1 | 0 | 1 | 1 | 0 | 0 | 0 | 0 | 0 | 1 | 1 | 1 | 0 | 0 | 0 | 0 |
| Signal A(n+1) | 1 | 1 | 1 | 1 | 0 | 0 | 0 | 0 | 0 | 1 | 0 | 1 | 1 | 1 | 1 | 1 | 1 | 0 | 0 | 0 | 0 | 0 | 1 | 0 | 1 | 1 | 1 | 1 | 0 | 1 |
| Signal A(n+2) | 1 | 1 | 0 | 0 | 0 | 0 | 0 | 1 | 0 | 1 | 0 | 0 | 1 | 1 | 1 | 0 | 1 | 0 | 0 | 0 | 1 | 1 | 1 | 0 | 1 | 0 | 0 | 0 | 1 | 0 |
| Signal A(n+3) | 0 | 1 | 1 | 0 | 0 | 1 | 0 | 0 | 1 | 1 | 0 | 1 | 0 | 1 | 0 | 0 | 0 | 0 | 0 | 1 | 1 | 1 | 0 | 1 | 1 | 0 | 0 | 1 | 0 | 0 |
| Signal A(n+4) | 1 | 1 | 1 | 1 | 1 | 1 | 0 | 1 | 1 | 1 | 0 | 1 | 1 | 1 | 0 | 1 | 1 | 0 | 0 | 0 | 1 | 0 | 0 | 1 | 1 | 0 | 0 | 0 | 1 | 0 |
| Signal B(n+5) | 1 | 0 | 0 | 1 | 1 | 0 | 0 | 1 | 1 | 0 | 0 | 1 | 1 | 0 | 1 | 0 | 1 | 0 | 0 | 1 | 1 | 0 | 0 | 1 | 1 | 0 | 0 | 1 | 1 | 0 |

ABSOLUTE ANGLE DETECTING DEVICE

This application claims the benefit of priority to Japanese Patent Application Nos. 2004-270242 filed on Sep. 16, 2004, herein incorporated by reference.

BACKGROUND OF THE INVENTION

1. Field of the Invention

The present invention relates to an absolute angle detecting device applicable to, for example, a steering angle sensor of a car, and more particularly, to a device that allows a control device to easily process signals.

2. Description of the Related Art

As the related art, there has been known a technique in which an absolute angle detecting device is provided between a steering shaft and a chassis of a car, and various control operations, such as the attenuation force control of a suspension, the shift position control of an automatic transmission, and the steering control of rear wheels of a car with four-wheel drive, are performed on the basis of, for example, the steering angle, steering speed, and steering direction of a steering wheel detected by the absolute angle detecting device.

The steering wheel (steering shaft) is constructed so as to make one or more rotations whenever it shifts from the neutral position to the right side and the left side. Therefore, an absolute angle detecting device formed by a combination of a rotation detecting unit for detecting a rotation angle within one revolution and a rotation detecting unit for detecting a rotation angle over one revolution is used to detect the steering angle of the steering shaft.

Further, as the related art, there have been suggested various absolute angle detecting devices in which an increment-type encoder for accurately detecting the rotation angle of a steering wheel within one revolution is composed of a code plate that integrally rotates with the steering wheel and a photo-interrupter that is arranged to face the code plate; an absolute-type encoder for roughly detecting the rotation angle of the steering wheel over one revolution includes a rotor member which integrally rotates with the code plate, a stator member which rotatably supports the rotor member, a rotary member which is concentrically arranged with the center of rotation of the rotor member, a relay gear which is rotatably supported by the rotary member, and a detecting element which detects the rotation amount of the rotary member; the relay gear intermittently engages with engaging projections provided on a circumferential surface of the rotor member; and the relay gear always engages with a driven gear provided in the stator member (for example, see Japanese Unexamined Patent Application Publication No. 10-227631 (FIGS. 5 to 8)).

The detecting element is used of an optical type using, for example, a photo-interrupter or a photo-reflector, a magnetic type using, for example, a magnet and an MR element or a hole element, or a contact type using, for example, a brush and a resistance pattern.

A control device mounted on a vehicle acquires signals respectively output from the rotation detecting unit for detecting the rotation amount of the steering wheel within one revolution and the rotation detecting unit for detecting the rotation amount of the steering wheel over one revolution to calculate the absolute angle of the steering wheel, and then generates various control signals on the basis of the calculated absolute angle.

As described above, the control device mounted on the vehicle acquires signals output from the respective rotation detecting units to calculate the absolute angle of the steering wheel. However, as in the absolute angle detecting device disclosed in Japanese Unexamined Patent Application Publication No. 10-227631, when the absolute angle within one revolution is signal-processed on the basis of code signals output from the increment-type encoder, and when the rotation amount over one revolution is signal-processed on the basis of signals output from the absolute-type encoder, which is different from the code signals, an algorithm for signal processing is complicated, which makes it difficult to process signals at high speed. In addition, in this case, a lot of signal processing circuits are needed, which makes it difficult to manufacture an absolute angle detecting device with low costs.

SUMMARY OF THE INVENTION

Accordingly, the invention has been made in view of the above problems, and it is an object of the invention to provide an absolute angle detecting device capable of simplifying an algorithm for signal processing, of performing signals processing at high speed, and of reducing the size of a signal processing circuit.

In order to achieve the above object, according to an aspect of the invention, an absolute angle detecting device includes a first rotation detecting unit that detects the rotation of a rotating body within one revolution in a housing; and a second rotation detecting unit that detects the rotation of the rotating body over one revolution. In the absolute angle detecting device, both the first rotation detecting unit and the second rotation detecting unit output code strings to obtain the same type of digital code.

When the code strings are output from both the first rotation detecting unit that detects the rotation of the rotating body within one revolution and the second rotation detecting unit that detects the rotation of the rotating body over one revolution to obtain the same type of digital code, the control device combines these digital codes into one code string to calculate an absolute angle within one revolution and a rotation amount over one revolution. Therefore, it is possible to simplify an algorithm for detecting the absolute angle of a rotating body and to perform signal processing at high speed. In addition, it is possible to reduce the size of circuits, and thus to achieve an absolute angle detecting device having a small size and low manufacturing costs.

Further, in the above-mentioned structure, it is preferable that a first code wheel provided in the first rotation detecting unit integrally rotate with the rotating body, and that a second code wheel provided in the second rotation detecting unit engage with an internal gear that is formed on an inner surface of the housing, so that the rotation speed of the second code wheel is reduced by the rotation of a planetary gear that rotates and revolves with the rotation of the rotating body.

According to this structure, it is possible to obtain a large reduction ratio in the first gear, without using a multistage gear, and to decrease the number of parts, which makes it possible to achieve an absolute angle detecting device having a small side and low manufacturing costs. In addition, since the internal gear and the planetary gear related to a deceleration mechanism always engage with each other, it is possible to improve the quietness of an absolute angle detecting device.

Further, in the above-mentioned structure, it is preferable that the internal gear be concentrically provided with the center of rotation of the rotating body, and the planetary gear has a circular opening at the center thereof. In addition, preferably, the first code wheel has a mounting portion that eccentrically rotates with a rotating axis of the rotating body while tightly engaging with the inner circumference of the opening, and the second code wheel is concentrically provided with the center of rotation of the rotating body. Further, it is preferable that convex portions be provided in one of the second code wheel and the planetary gear, and holes or concave portions fitted by the convex portions are provided in the other of the second code wheel and the planetary gear.

According to this structure, it is possible to achieve a compact structure for reducing the rotation speed of the second code wheel, and to obtain a large reduction ratio in the first gear, which makes it possible to improve the quietness of an absolute angle detecting device.

Furthermore, in the above-mentioned structure, it is preferable that the main surface of the first code wheel and the main surface of the second code wheel be formed on the same surface.

According to this structure, it is possible to reduce the thickness of an absolute angle detecting device.

Moreover, in the above-mentioned structure, it is preferable that the convex portions be a plurality of engaging projections that are formed on the second code wheel, and that the holes or concave portions be a plurality of ring-shaped engaging holes that are provided around the opening of the planetary gear.

According to this structure, it is possible to reliably improve the quietness of an absolute angle detecting device.

DESCRIPTION OF THE PREFERRED EMBODIMENT

Figure 1:
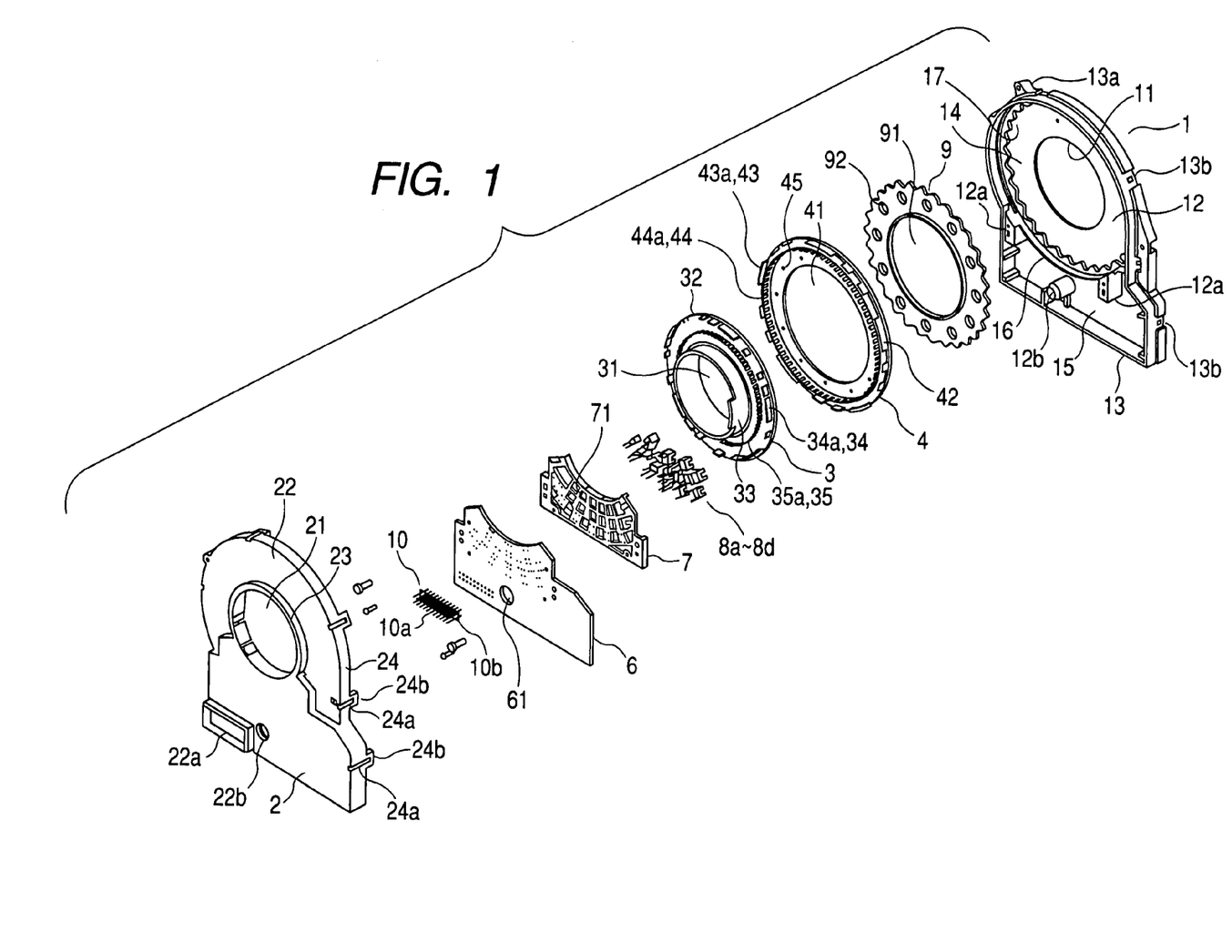
FIG. 1 is an exploded perspective view of a rotation detecting device according to an embodiment of the invention.
Figure 2:
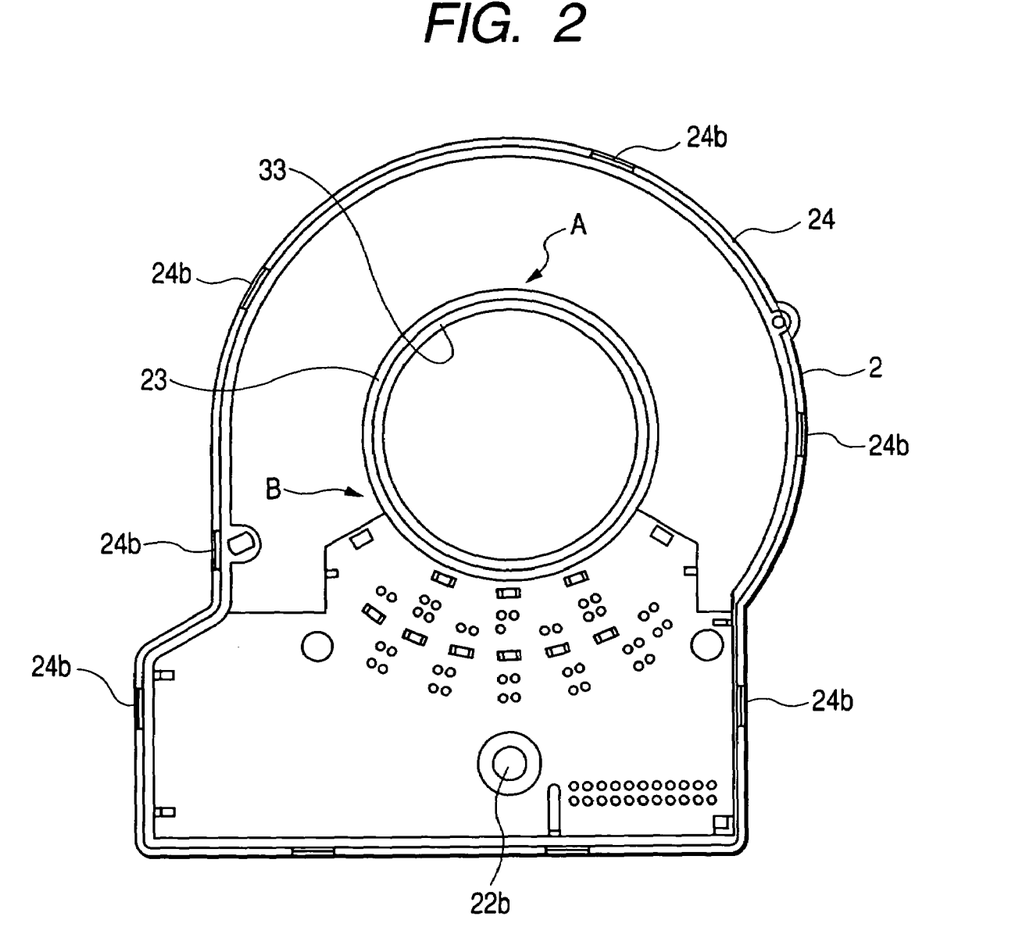
FIG. 2 is a view illustrating the inner structure of a cover according to the embodiment.
Figure 3:
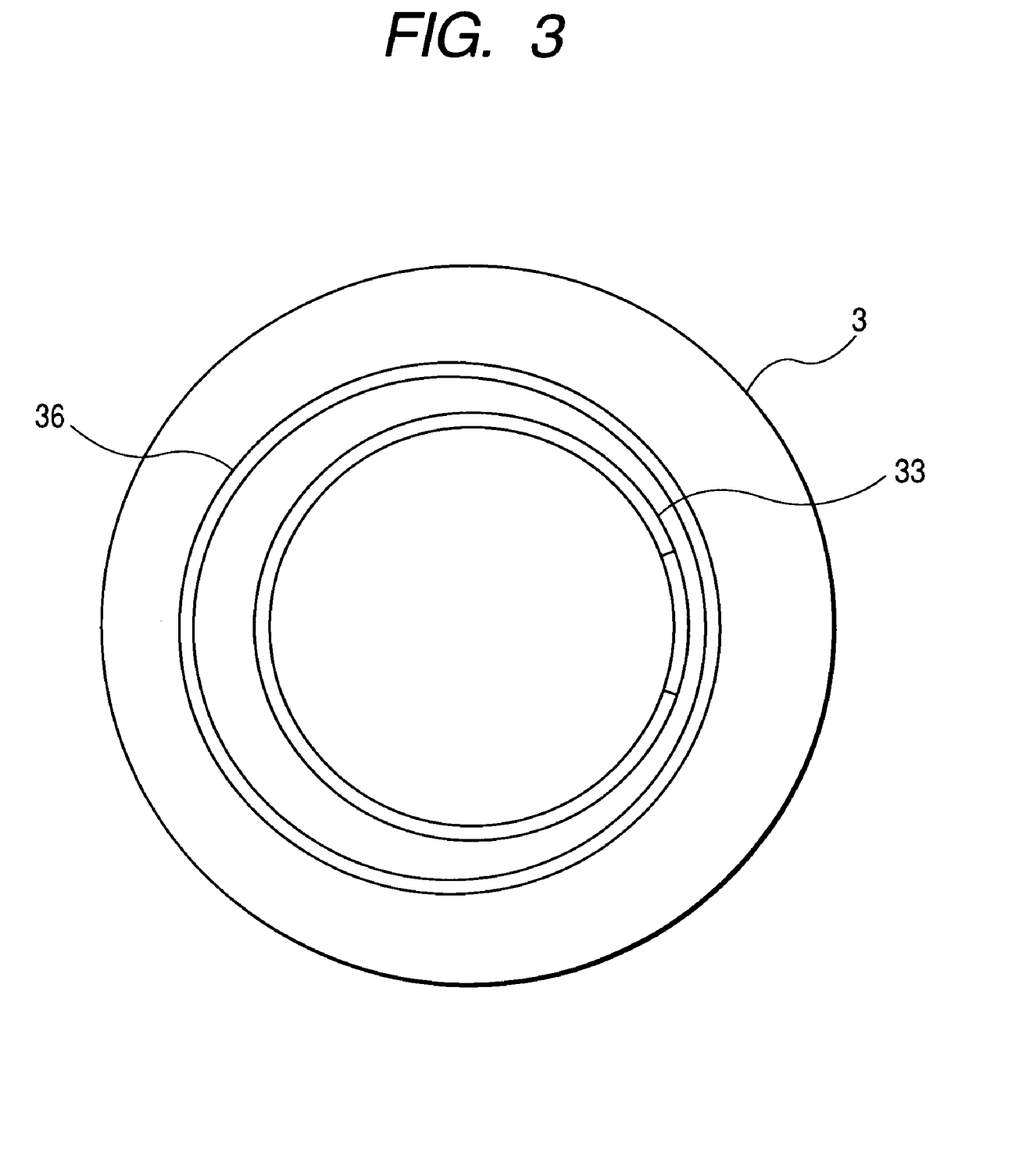
FIG. 3 is a view illustrating a rear surface of a first code wheel according to the embodiment.
Figure 4:
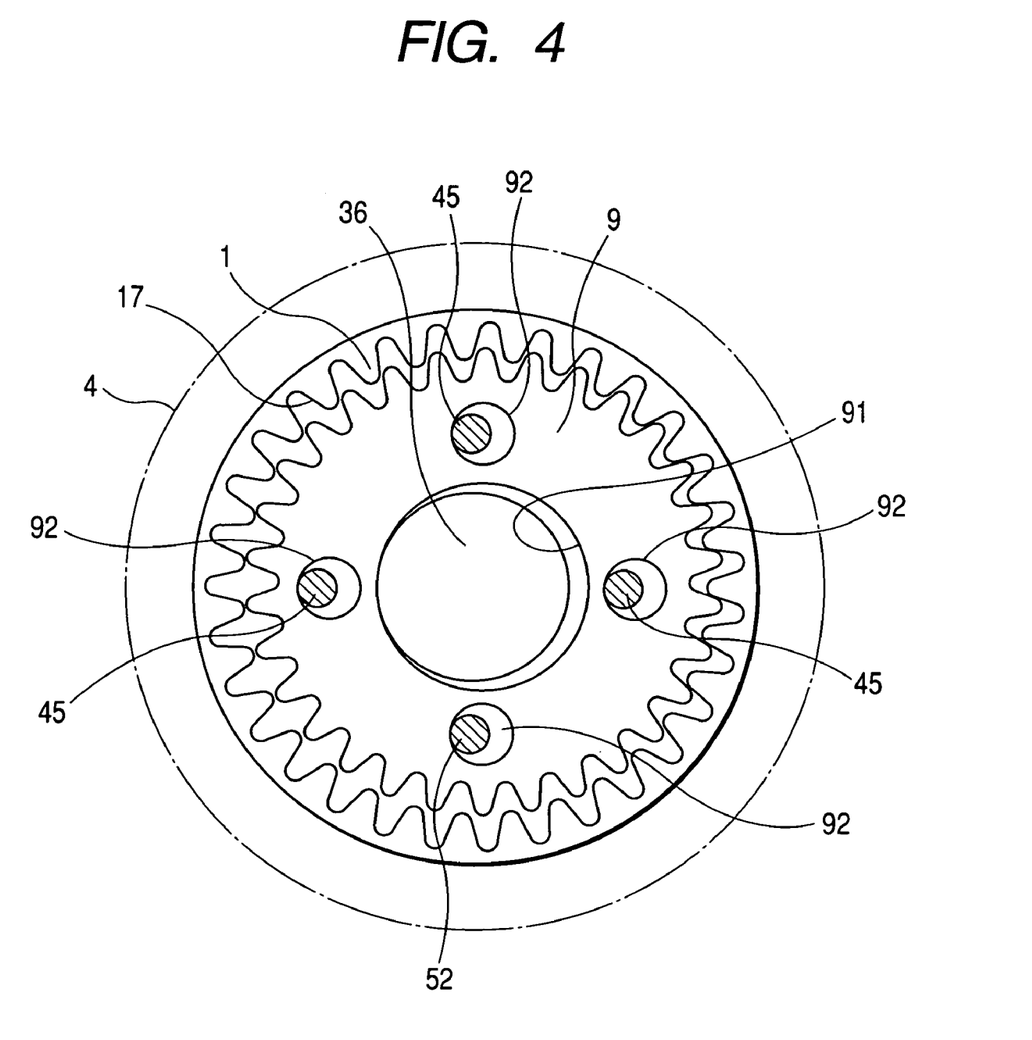
FIG. 4 is a view illustrating the connection state of a planetary gear, an internal gear, and a second code wheel on an inner surface of a case according to the embodiment.
Figure 5:
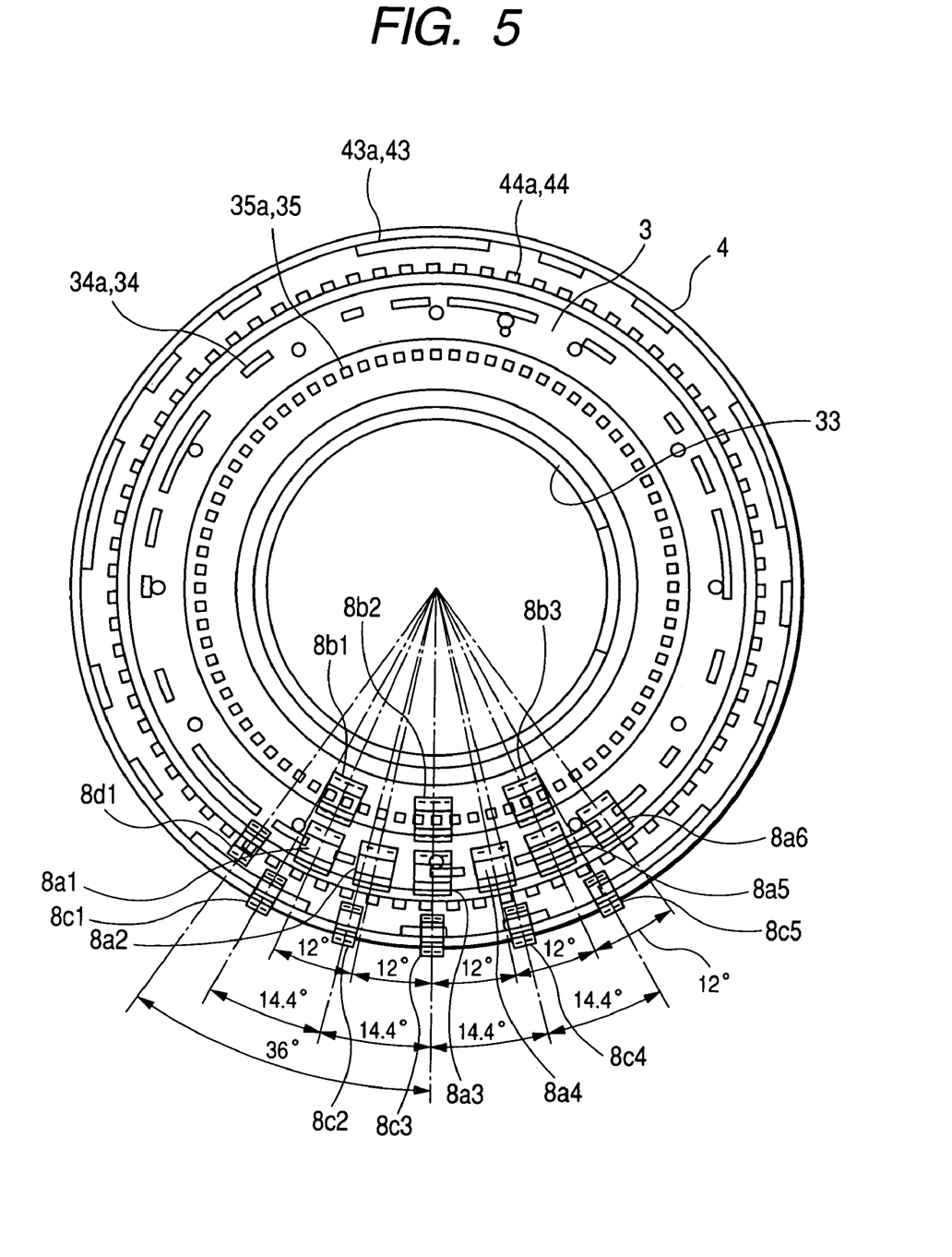
FIG. 5 is an explanatory diagram illustrating the assembled state of the first code wheel, the second code wheel, and signal detecting element groups according to the embodiment.
Figure 6:
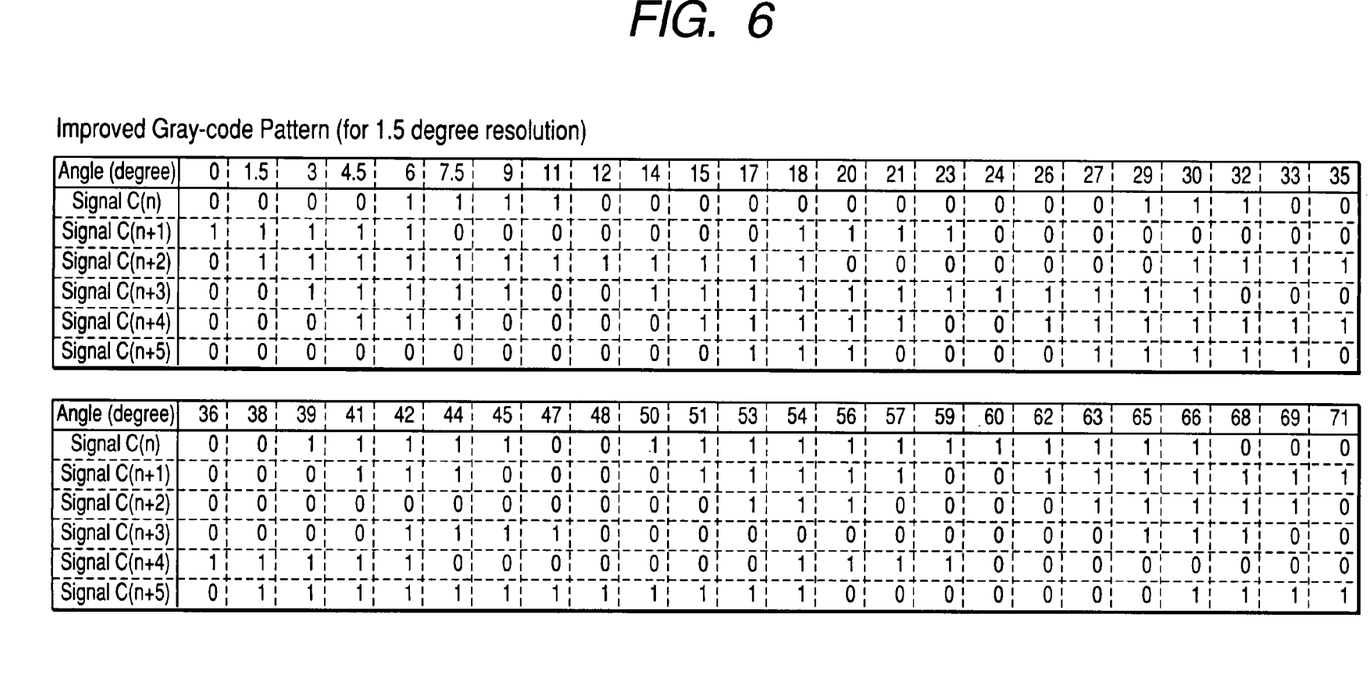
FIG. 6 is a table showing a gray-code pattern detected by the first code wheel according to the embodiment.
Figure 7:
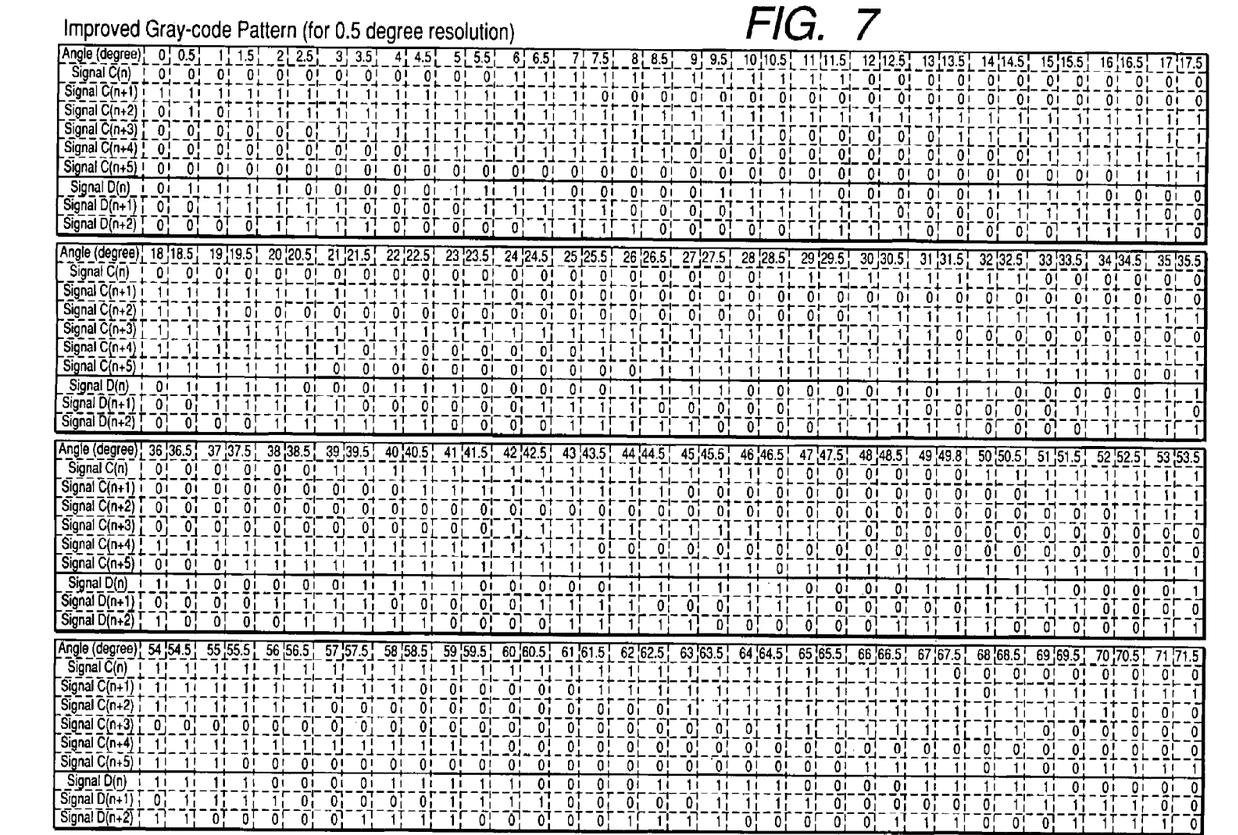
FIG. 7 is a table showing another gray-code pattern detected by the first code wheel according to the embodiment.
Figure 8:
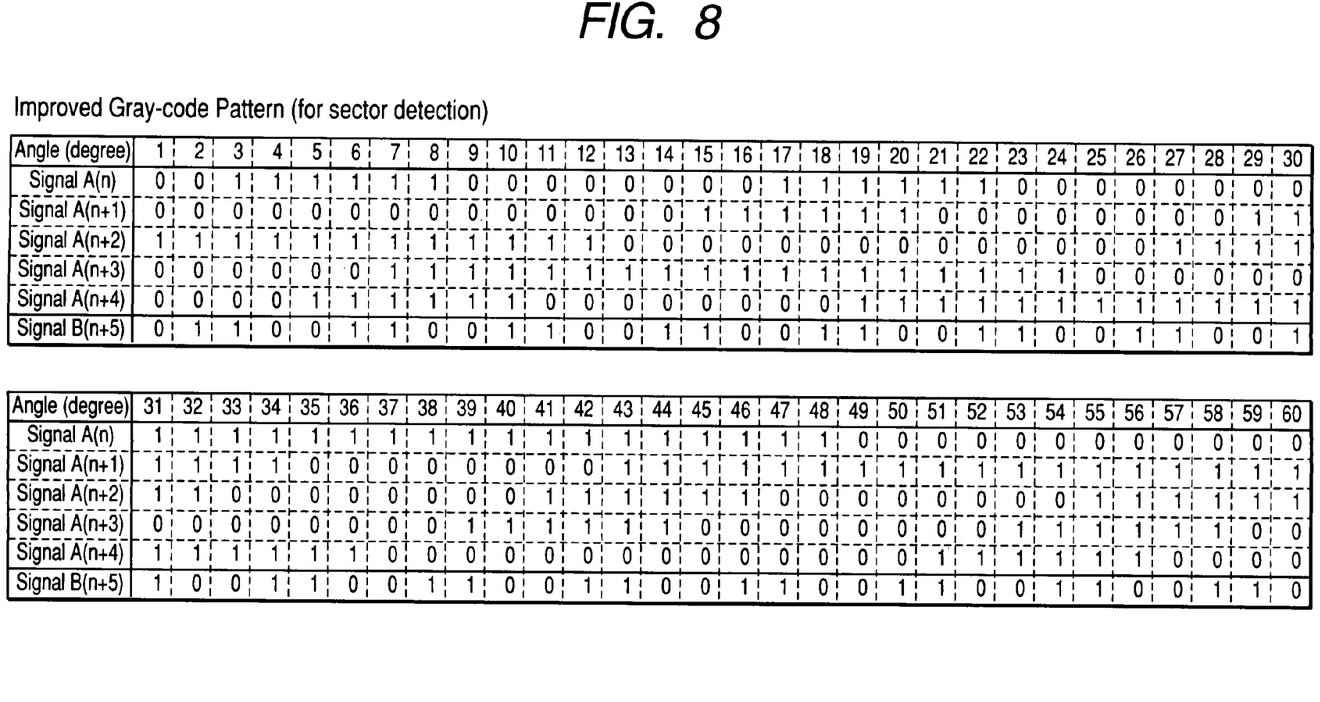
FIG. 8 is a table showing a gray-code pattern detected by the second code wheel according to the embodiment.

Hereinafter, a code wheel supporting structure of a rotation detecting device, which is an example of a rotary member supporting structure according to the invention, will be described with reference to FIGS. 1 to 8. FIG. 1 is an exploded perspective view of the rotation detecting device according to an embodiment of the invention. FIG. 2 is a view illustrating an inner side of a cover according to the embodiment. FIG. 3 is a view illustrating a rear side of a first code wheel according to the embodiment. FIG. 4 is a view illustrating an inner connection state of a planetary gear, an internal gear, and a second code wheel according to the embodiment. FIG. 5 is an explanatory diagram illustrating an assembly of the first code wheel, the second code wheel, and a signal detecting element group according to the embodiment. FIGS. 6 and 7 are tables illustrating gray-code patterns detected by the first code wheel according to the embodiment. FIG. 8 is a table illustrating a gray-code pattern detected by the second code wheel according to the embodiment.

As shown in FIG. 1, the rotation angle detecting device according to this embodiment includes, as main components, a case 1, a cover 2, first and second code wheels 3 and 4 which are rotatably provided in a housing composed of an assembly of the case 1 and the cover 2 such that they can be rotated relative to each other and which have substantially the same main surface, as shown in FIG. 5, a circuit board 6 that is provided on an inner surface of the case 1, a signal detecting element supporting member 7 that is mounted on the circuit board 6, four signal detecting element groups 8a to 8d that are provided in the signal detecting element supporting member 7 in a predetermined arrangement such that terminals thereof are electrically connected to terminals formed on the circuit board 6, a planetary gear 9 that is rotated by the first code wheel 3 to drive the second code wheel 4 at a predetermined reduction ratio such that the second code is decelerated, and a connector 10 having one end connected to the circuit board 6 and the other end facing a connector inserting hole formed in the cover 2.

The case 1 includes a bottom plate 12 having a central opening 11, a circumferential wall 13 that is erected from the outer circumference of the bottom plate 12 with a predetermined height, and an arc-shaped partition wall 16 that is erected between a circular code wheel receiving portion 14 and a rectangular circuit board receiving portion 15. An internal gear 17 meshed with the planetary gear 9 is concentrically formed with a rotating axis of a rotating body (steering wheel), that is, with the central opening 11, in the inner surface of the code wheel receiving portion 14. In addition, a circuit board mounting boss 12a for mounting the circuit board 6 and a positioning projection 12b for positioning the cover 2 with respect to the case 1 are formed on the inner surface of the bottom plate 12. Further, a case mounting boss 13a for mounting the case 1 to a predetermined stator portion, for example, a chassis of a car and an anchoring claw 13b for snap-coupling the cover 2 to the case 1 are formed on an outer surface of the circumferential wall 13.

The cover 2 includes an upper plate 22 having a central opening 21, a cylindrical guide portion 23 that is erected from the inner circumference of the upper plate 22 to the outside, and a circumferential wall 24 that is erected from the outer circumference of the upper plate 22 to the inside, and is formed substantially in the same size and shape as those of the case 1 in plan view.

The case 1 and the cover 2 are incorporated into one body by fitting the anchoring claw 13b formed on the case 1 into an engaging hole 24a formed in the cover 2, thereby constituting a housing for accommodating other members 3 to 10.

The first code wheel 3 includes a first code plate 32 having a ring-shaped central opening 31 and a cylindrical rotating-body-connecting portion 33 that is erected from the central opening 31. A first signal detecting track 34 composed of a plurality of protruding signal-detecting shielding plates 34a which are arranged in a predetermined array and a second signal detecting track 35 composed of a plurality of protruding signal-detecting shielding plates 35a which are arranged in a predetermined array are concentrically formed on one surface of the first code plate 32. The first code wheel 3 is fixed to a rotating body (not shown), such as a steering shaft passing through the central opening 31, so as to rotate together with the rotating body. In addition, as shown in FIG. 3, a ring-shaped planetary gear mounting portion 36 for rotating and revolving the planetary gear 9 in the inner circumference of the internal gear 17 protrudes from the rear surface of the first code plate 32 so as to be eccentric with respect to the rotating axis of the rotating body.

The second code wheel 4 is composed of a second code plate 42 having a ring-shaped central opening 41 that is concentrically provided with the rotating axis of the rotating body. A third signal detecting track 43 composed of a plurality of protruding signal-detecting shielding plates 43a which are arranged in a predetermined array and a fourth signal detecting track 44 composed of a plurality of protruding signal-detecting shielding plates 44a which are arranged in a predetermined array are concentrically formed on one surface of the second code plate 42. In addition, as shown in FIG. 4, a plurality of engaging projections 45 for connecting the planetary gear 9 are formed at regular intervals on the rear surface of the second code plate 42.

The circuit board 6 is formed in a shape capable of being accommodated into the circuit board receiving portion 15 formed by the case 1 and the cover 2, and a hole 61 through which a positioning projection 12b formed in the case 1 passes is formed at a predetermined position of the circuit board 6. In addition, a predetermined circuit pattern including terminals of the signal detecting elements 8 and terminals for electrically connecting connector pins 10a is formed on the circuit board 11.

In the planetary gear 9, a plurality of ring-shaped engaging holes 92 are formed at regular intervals around a circular central opening 91. The planetary gear mounting portion 36 provided on the first code wheel 3 is fitted into the central opening 91 so as to eccentrically rotate with respect to the rotating axis of the rotating body, and the engaging projections 45 formed on the rear surface of the second code wheel 4 are respectively fitted into the engaging holes 92. In this way, when the first code wheel 3 is rotated, the planetary gear mounting portion 36 is rotated while being deeply fitted into the central opening 91. Therefore, the planetary gear 9 rotates and revolves in the inner circumference of the internal gear 17 while being meshed with the internal gear 17 of the case 1. Here, the number of teeth of the planetary gear 9 and the internal gear 17 is set such that the rotation speed of the second code wheel 4 with respect to the first code wheel 3 is reduced. For example, when the number of teeth of the internal gear 17 is 31 and the number of teeth of the planetary gear 9 is 30, the reduction ratio of the second code wheel 4 to the first code wheel 3 can be set to 1:30. As such, the second code wheel 4 is concentrically provided with the rotating axis of the rotating body to function as a rotation transmitting portion which is rotated by the rotation of the planetary gear 9, and the second code wheel 4 is rotated at a reduced speed with respect to the first code wheel 3. In addition, in this embodiment, the engaging projections 45 are fitted into the engaging holes 92. However, concave portions may be used instead of the engaging holes 92. Further, the engaging projections 45 may be formed on one of the second code wheel 4 and the planetary gear 9, and the engaging holes 92 may be formed on the other of the second code wheel 4 and the planetary gear 9.

The connector 10 is composed of a predetermined number of connector pins 10a and a holding portion 10b, made of an insulating resin, for holding the connector pins 10a in a predetermined arrangement. One end of each of the connector pins 10a is connected to the circuit board 6, and the other end thereof is arranged to face a connector inserting hole 22a.

A plurality of signal detecting elements 8 are arranged on the signal detecting element supporting member 7 in a predetermined array. In addition, the signal detecting element supporting member 7 has detecting element mounting portions 71 which are partitioned to separately mount the signal detecting elements 8, and is fixed to the circuit board 6 by screws.

Photo-interrupters are used as the signal detecting elements constituting the first to fourth signal detecting element groups 8a to 8d, and each photo-interrupter is formed by integrally forming a light-emitting element and a light-receiving element such that the light-emitting element and the light-receiving element are arranged opposite to each other at an interval capable of passing through the shielding plates 34a, 35a, 43a, and 44a which are respectively formed in the first and second code wheels 3 and 4. As shown in FIG. 5, the signal detecting element groups 8a to 8d are arranged in predetermined arrays to face the corresponding signal detecting tracks 34, 35, 43, and 44, respectively.

That is, six signal detecting elements 8a1 to 8a6 constituting the first signal detecting element group 8a are arranged at a pitch of 12° to face the first signal detecting track 34, and three signal detecting elements 8b1 to 8b3 constituting the second signal detecting element group 8b are arranged at a pitch of 24° to face the second signal detecting track 35. In addition, five signal detecting elements 8c1 to 8c5 constituting the third signal detecting element group 8c are arranged at a pitch of 14.4° to face the third signal detecting track 43, and one signal detecting element 8d1 constituting the fourth signal detecting element group 8d is arranged to face the fourth signal detecting track 44 at a position deviating from the set position of the signal detecting element 8c3 by 36° in the circumferential direction of the second code wheel 4.

In the first signal detecting track 34, the shielding plates 34a are set such that a 48-step circular code obtained by combining eight 6-bit code strings is output from the six signal detecting elements 8a1 to 8a6, and the eight 6-bit code strings are selected from nine 6-bit code strings, that is, (100000), (110000), (101000), (111000), (110100), (101100), (111100), (111010), and (111110), in which the same code does not appears regardless of the read order of them. Therefore, when one sector is set to 72°, it is possible to obtain a gray-code having a resolution of 1.5°.

In the second signal detecting track 35, the shielding plates 35a are set such that a circular additional code string is output from three signal detecting elements 8b1 to 8b3, and the circular additional code string divides the gray-code having a resolution of 1.5° obtained from the 6-bit code string by the first signal detecting element group 8a into three parts. In this way, a 9-bit code string is output by the six signal detecting elements 8a1 to 8a6 constituting the first signal detecting element group 8a and the three signal detecting elements 8b1 to 8b3 constituting the second signal detecting element group 8b, which makes it possible to obtain a gray-code having one sector of 72° and a resolution of 0.5°, as shown in FIG. 7.

FIGS. 6 and 7 show gray-code patterns corresponding to one sector which are obtained by the first signal detecting track 34 and the first signal detecting element group 8a, and the second signal detecting track 35 and the second signal detecting element group 8b, respectively. In FIGS. 6 and 7, 'signalC(n)' to 'signalC(n+5)' indicate codes detected by the six signal detecting elements 8a1 to 8a6 constituting the first signal detecting element group 8a, respectively, and 'signalD(n)' to 'signalD(n+2)' indicate codes detected by the three signal detecting elements 8b1 to 8b3 constituting the second signal detecting element group 8b, respectively. As can apparently be seen from FIGS. 6 and 7, in the absolute angle detecting device according to this embodiment, a first code string obtained by a combination of six codes supplied from the first signal detecting element group 8a is composed of a circular gray-code having a resolution of 1.5°. In addition, a second code string is obtained by a combination of six codes which are supplied from the first signal detecting element group 8a and constitute the first code string and three codes which are supplied from the second signal detecting element group 8b and constitute the additional code, and the second code string is composed of a circular gray-code having a resolution of 0.5°. Therefore, a control device (not shown) can appropriately divide these circular gray-codes, if necessary.

In the second code wheel 4, the third signal detecting track 43 and the third signal detecting element group 8c arranged to face the third signal detecting track 43, and the fourth signal detecting track 44 and the fourth signal detecting element group 8d arranged to face the fourth signal detecting track 44 enables the discrimination of the sector according to the rotation amount of the first code wheel 3. As can apparently be seen from FIG. 8, two different gray-codes are assigned to each sector. This structure is used to prevent the false detection of an absolute angle even when relative deviation occurs between the gray-code for detecting the sector and the gray-code having a resolution of 0.5° and the gray-code having a resolution of 1.5°. In this embodiment, when the deviation amount is smaller than 18°, the false detection can be prevented.

FIG. 8 shows a sector discriminating gray-code pattern obtained by the third signal detecting track 43 and the third signal detecting element group 8c, and the fourth signal detecting track 44 and the fourth signal detecting element group 8d. In FIG. 8, 'signalA(n)' to 'signalA(n+4)' indicate codes detected by the five signal detecting elements 8c1 to 8c5 constituting the third signal detecting element group 8c, respectively, and 'signalB(n+5)' indicates a code detected by one signal detecting element 8d1 constituting the fourth signal detecting element group 8d. As can be apparently seen from FIG. 8, in the absolute angle detecting device according to this embodiment, a gray-code is obtained by a combination of five codes supplied from the third signal detecting element group 8c and one code supplied from the fourth signal detecting element group 8d, and the obtained gray-code is composed of a 60-step circular code. Therefore, it is possible to assign two different gray-codes to every 30 sectors, and to detect an absolute angle of ±1080° (±three rotations) in which one sector is composed of 72°.

Hereinafter, the usage and operation of the absolute angle detecting device having the above-mentioned structure will be described.

When the absolute angle detecting device having the above-mentioned structure is used as a steering angle sensor for a car, a steering shaft is inserted into the rotating body connecting portion 33 so that the steering shaft is integrally connected to the rotating body connecting portion 33. In addition, the housing is fixed to a stator portion of a car, such as a chassis, by using the case mounting boss 13a formed on the case 1.

When the steering shaft is rotated, the first code wheel 3 rotates around the center of rotation of the steering shaft in the rotational direction of the steering shaft by an angle corresponding to the rotation amount of the steering shaft. In addition, a 6-bit code string is output from the six signal detecting elements 8a1 to 8a6 constituting the first signal detecting element group 8a, according to the arrangement of the shielding plates 34a, and a 3-bit code string is output from the three detecting elements 8b1 to 8b3 constituting the second signal detecting element group 8b, according to the arrangement of the shielding plates 35a. A control device (not shown) acquires a gray-code having a resolution of 1.5° from the 6-bit code string, or a gray-code having a resolution of 0.5° from a 9-bit code string obtained by a combination of the 6-bit code string and the 3-bit code string to control predetermined vehicle-mounted devices. Therefore, the control device can select one of two different resolutions in the same device to detect a rotation angle within one revolution, if necessary.

Further, the planetary gear 9 revolves around the center of rotation of the steering shaft with the rotation of the first code wheel 3, and the planetary gear 9 engages with the internal gear 17 formed in the case 1 to be rotated. Then, the rotation of the planetary gear 9 is transmitted to the second code wheel 4 connected to the planetary gear 9, and the second code wheel 4 is rotated at a predetermined reduction ratio. As a result, a five-bit code string is output from the five signal detecting elements 8c1 to 8c5 constituting the third signal detecting element group 8c, according to the arrangement of the shielding plates 43a, and a one-bit code string is output from the signal detecting element 8d1 constituting the fourth signal detecting element group 8d, according to the arrangement of the shielding plates 44a. The control device (not shown) acquires a 30-step gray-code from a 6-bit code string obtained by a combination of the 5-bit code string and the one-bit code string to perform the discrimination of each sector, thereby detecting the rotation of the steering shaft over one sector.

The absolute angle detecting device of this embodiment detects an absolute angle within one rotation, on the basis of the circular gray-code string output from the first signal detecting element group 8a that is arranged to face the first signal detecting track 34 of the first code wheel 3, or on the basis of the circular gray-code string obtained by a combination of gray-codes respectively output from the first signal detecting element group 8a and the second signal detecting element group 8b which are arranged to face the first signal detecting track 34 and the second signal detecting track 35, respectively. In addition, the absolute angle detecting device can discriminate each sector in the movable range of a rotating body, on the basis of the circular gray-code string obtained by a combination of gray-codes respectively output from the third signal detecting element group 8c and the fourth signal detecting element group 8d which are respectively arranged to face the third signal detecting track 43 and the fourth signal detecting track 44 of the second code wheel 4 rotated with respect to the first code wheel 3 at a reduced speed. Therefore, the control device can calculate an absolute angle within one rotation and a rotation angle over one rotation, using the same type of digital code. Thus, it is possible to simplify an algorithm for detecting the absolute angle of a rotating body, and thus to reduce the size of the control device, which makes it possible to achieve high-speed signal processing, a reduction in the size of an absolute angle detecting device, and low manufacturing costs.

Furthermore, in the absolute angle detecting device of this embodiment, the first code wheel 3 is connected to the second code wheel 4 through the internal gear 17 and the planetary gear 9 which are formed in the case 1 to engage with each other. Therefore, it is possible to obtain a large reduction ratio in the first gear, and thus to reduce the number of parts, which makes it possible to achieve an absolute angle detecting device having low manufacturing costs and a small size. In addition, since the first code wheel 3 and the second code wheel 4 are always connected to each other through the internal gear 17 and the planetary gear 9, it is possible to improve the quietness of an absolute angle detecting device.

Further, in the above-described embodiment, only the two signal detecting tracks 34 and 35 are formed in the first code wheel 3, but three or more signal detecting tracks may be formed therein. In addition, in the present embodiment, only the two signal detecting tracks 43 and 44 are formed in the second code wheel 4, but one or three or more signal detecting tracks may be formed therein.

Moreover, in the above-described embodiment, a signal detecting system is formed by a combination of the shielding plates and the photo-interrupters. However, the invention is not limited thereto, but the signal detecting system may be formed by a combination of photo-interrupters and an optical pattern, such as clearance holes and notched portions, a combination of a magnetic pattern and magnetism detecting elements, or a combination of a resistor pattern and a collecting brush.

Further, in the above-described embodiment, a gray-code is used as an example of a digital code. However, the invention is not limited thereto, but other digital codes, such as M codes, may be used instead of the gray-code.

As described above, according to the absolute angle detecting device of the invention, the code strings are output from both the first rotation detecting unit that detects the rotation of the rotating body within one revolution and the second rotation detecting unit that detects the rotation of the rotating body over one revolution to obtain the same type of digital code. Therefore, the control device combines these digital codes into one code string to calculate an absolute angle within one revolution and a rotation amount over one revolution. Thus, it is possible to simplify an algorithm for detecting the absolute angle of a rotating body and to perform signal processing at high speed. In addition, it is possible to reduce the size of circuits, and thus to achieve an absolute angle detecting device having a small size and low manufacturing costs.

The invention claimed is:

1. An absolute angle detecting device comprising:
a first rotation detecting unit that detects rotation of a rotating body within one revolution in a housing that includes an case with a bottom plate having a first central opening, and a cover provided with an upper plate having a second central opening;
a second rotation detecting unit that detects the rotation of the rotating body over one revolution;
an internal gear that is formed on an inner surface of the bottom plate; and
a planetary gear that rotates and revolves with the rotation of the rotating body and is engaged with the internal gear inside the housing;
wherein both the first rotation detecting unit and the second rotation detecting unit output code strings to obtain the same type of digital code string, and
wherein the second rotation detecting unit is engaged with the internal gear through the planetary gear.

2. The absolute angle detecting device according to claim 1,
wherein a first code wheel provided in the first rotation detecting unit integrally rotates with the rotating body, and
a second code wheel provided in the second rotation detecting unit engages with the internal gear so that a rotation speed of the second code wheel is reduced by rotation of the planetary gear.

3. The absolute angle detecting device according to claim 2,
wherein the internal gear is concentrically provided with a center of rotation of the rotating body,
the planetary gear has a circular opening at a center thereof,
the first code wheel has a mounting portion that eccentrically rotates with a rotating axis of the rotating body while tightly engaging with an inner circumference of the opening,
the second code wheel is concentrically provided with the center of rotation of the rotating body, and
convex portions are provided in one of the second code wheel and the planetary gear, and holes or concave portions fitted by the convex portions are provided in the other of the second code wheel and the planetary gear.

4. The absolute angle detecting device according to claim 3,
wherein the convex portions are a plurality of engaging projections that are formed on the second code wheel, and
the holes or concave portions are a plurality of ring-shaped engaging holes that are provided around the opening of the planetary gear.

5. The absolute angle detecting device according to claim 1, wherein the reduction ratio of the second code wheel to the first code wheel is 1:30.

6. The absolute angle detecting device according to claim 1, wherein the output code strings from both the first rotation detecting unit and the second rotation detecting unit are digital output code strings.

7. An absolute angle detecting device comprising:
a first rotation detecting unit that detects rotation of a rotating body within one revolution in a housing;
a second rotation detecting unit that detects the rotation of the rotating body over one revolution, wherein both the first rotation detecting unit and the second rotation detecting unit output code strings to obtain the same type of digital code string and wherein a first code wheel provided in the first rotation detecting unit integrally rotates with the rotating body; and
a second code wheel provided in the second rotation detecting unit engages with an internal gear that is formed on an inner surface of the housing, so that a rotation speed of the second code wheel is reduced by rotation of a planetary gear that rotates and revolves with the rotation of the rotating body,
wherein the internal gear is concentrically provided with a center of rotation of the rotating body, the planetary gear has a circular opening at a center thereof, the first code wheel has a mounting portion that eccentrically rotates with a rotating axis of the rotating body while tightly engaging with an inner circumference of the opening, the second code wheel is concentrically provided with the center of rotation of the rotating body, and convex portions are provided in one of the second code wheel and the planetary gear, and holes or concave portions fitted by the convex portions are provided in the other of the second code wheel and the planetary gear, and
wherein the housing includes a case provided with a bottom plate having a first central opening, and cover provided with an upper plate having a second central opening, the internal gear being provided on an inner surface of the bottom plate.

8. The absolute angle detecting device according to claim 7,
wherein the convex portions are a plurality of engaging projections that are formed on the second code wheel, and
the holes or concave portions are a plurality of ring-shaped engaging holes that are provided around the opening of the planetary gear.

9. The absolute angle detecting device according to claim 7, wherein the digital code is a gray code.

10. The absolute angle detecting device according to claim 9, wherein the gray code is a circular gray code.

11. The absolute angle detecting device according to claim 10, wherein the second code wheel has a third central opening that is concentrically provided with the rotating axis of the rotating body.

12. The absolute angle detecting device according to claim 7, wherein the reduction ratio of the second code wheel to the first code wheel is 1:30.

13. The absolute angle detecting device according to claim 7, wherein the output code strings from both the first rotation detecting unit and the second rotation detecting unit are digital output code strings.

* * * * *